United States Patent [19]
Freedman

[11] Patent Number: 5,516,393
[45] Date of Patent: May 14, 1996

[54] LABELLING OF SUBSTRATES

[75] Inventor: Melvin S. Freedman, Beachwood, Ohio

[73] Assignee: Avery Dennison Corporation, Pasadena, Calif.

[21] Appl. No.: 55,462

[22] Filed: Apr. 29, 1993

[51] Int. Cl.⁶ ..................................................... B32B 31/00
[52] U.S. Cl. ........................... 156/229; 156/289; 156/247; 156/250; 156/249; 156/256; 156/267
[58] Field of Search .................................... 156/229, 289, 156/247, 250, 249, 256, 267

[56] References Cited

U.S. PATENT DOCUMENTS

| | | |
|---|---|---|
| Re. 32,929 | 5/1989 | Ewing . |
| 2,718,666 | 9/1955 | Knox . |

(List continued on next page.)

FOREIGN PATENT DOCUMENTS

| | | |
|---|---|---|
| 888148 | 12/1971 | Canada . |
| 1138817 | 1/1983 | Canada . |
| 060421 | 9/1982 | European Pat. Off. . |
| 58-113283 | 7/1983 | Japan . |
| 59-122570 | 7/1984 | Japan . |
| 633481 | 12/1982 | Switzerland . |
| 1384556 | 2/1975 | United Kingdom . |
| 1404018 | 8/1975 | United Kingdom . |
| 1578517 | 11/1980 | United Kingdom . |

OTHER PUBLICATIONS

Opticite Label Films—Printing, brochure—Dow Chemical U.S.A., Films Group, Form No. 500-1087-108.
Soda Packing Looks Super when Printed, information sheet, Copyright 1984, The Dow Chemical Company.
Opticite Label Film 320—information specification sheet, Copyright 1985, The Dow Chemical Company, Form No. 500-1058-85.
Opticite Label Film 330–information specification sheet, Copyright 1985, The Dow Chemical Company, Form No. 500-1059-85.
Opticite Label Film 420–information specification sheet, Copyright 1985, The Dow Chemical Company, Form No. 500-1060-85.
Opticite Label Film 410–information specification sheet, Copyright 1985, The Dow Chemical Company, Form No. 500-1061-85.
Opticite Label Film Supplier Information, information sheet, Copyright 1985, The Dow Chemical Company, Form No. 500-1062-85.
Opticite Label Film Technical Information for Printing, information sheet, Copyright 1985, The Dow Chemical Company, Form No. 500-1063-85.
New Opticite Polystyrene Label Films, brochure, The Dow Chemical Company, Form No. 500-1053-84.
Opticite Soft Drink Label Film 320, information sheet, The Dow Chemical Company, Form No. 500-1046-84.
Label Film Offers Design Options, reprint from Paper, Film & Foil Converter, Apr. 1985, The Dow Chemical Company, Form No. 500-1084-85.
Plastic Film Labels Have Vivid Graphics, High–Gloss, and Moisture Resistance, reprint from Prepared Foods, Sep. 1984, The Dow Chemical Company, Form No. 500-1084-84.
Opticite Soft Drink Label Films, brochure, Copyright 1985, The Dow Chemical Company.
Opticite Label Film 320, information sheet, Copyright 1985, The Dow Chemical Company, Form No. 500-1046-85.

(List continued on next page.)

*Primary Examiner*—Chester T. Barry
*Attorney, Agent, or Firm*—Renner, Otto, Boisselle & Sklar

[57] ABSTRACT

Extruded heat-set polymeric films are die-cut into labels, dispensed past peel-back edges, and applied to deformable or rigid substrates after being treated differently in their lengthwise and cross-directions so as to have different stiffnesses in the respective directions and achieve a tradeoff between dispensability and conformability superior to that of prior art labels of heat-set polymeric material.

19 Claims, 2 Drawing Sheets

U.S. PATENT DOCUMENTS

| | | |
|---|---|---|
| 2,920,352 | 1/1960 | Miller . |
| 3,036,945 | 5/1962 | Souza . |
| 3,100,722 | 8/1963 | Herrmann . |
| 3,154,461 | 10/1964 | Johnson . |
| 3,187,982 | 6/1965 | Underwood . |
| 3,354,506 | 11/1967 | Raley . |
| 3,370,951 | 2/1968 | Hausenauer . |
| 3,382,206 | 5/1968 | Karickhoff . |
| 3,468,744 | 9/1969 | Reinhart . |
| 3,515,626 | 6/1970 | Duffield . |
| 3,690,909 | 9/1972 | Finley . |
| 3,841,943 | 10/1974 | Takashi . |
| 3,871,947 | 3/1975 | Brekken . |
| 3,894,904 | 7/1975 | Cook . |
| 3,908,065 | 9/1975 | Stigen . |
| 3,924,051 | 12/1975 | Wiggins . |
| 3,936,567 | 2/1976 | Vesely . |
| 3,963,851 | 6/1976 | Toyoda . |
| 3,968,196 | 7/1976 | Wiley . |
| 3,979,000 | 9/1976 | Karabedian . |
| 4,008,115 | 2/1977 | Fairbanks . |
| 4,011,358 | 3/1977 | Roelofs . |
| 4,020,215 | 4/1977 | Michaylov . |
| 4,051,293 | 9/1977 | Wiley . |
| 4,057,667 | 11/1977 | Wiggens . |
| 4,069,934 | 1/1978 | Karabedian . |
| 4,082,880 | 4/1978 | Zboril . |
| 4,091,150 | 5/1978 | Roelofs . |
| 4,100,237 | 7/1978 | Wiley . |
| 4,118,438 | 10/1978 | Matsui . |
| 4,151,319 | 4/1979 | Sackoff . |
| 4,172,163 | 10/1979 | Magnotta . |
| 4,188,443 | 2/1980 | Mueller . |
| 4,233,367 | 11/1980 | Ticknor . |
| 4,235,341 | 11/1980 | Martin . |
| 4,242,402 | 12/1980 | Korpman . |
| 4,246,058 | 1/1981 | Reed . |
| 4,254,169 | 3/1981 | Schroeder . |
| 4,331,727 | 5/1982 | Maas . |
| 4,343,851 | 8/1982 | Sheptak . |
| 4,346,855 | 8/1982 | Biggar . |
| 4,361,628 | 11/1982 | Krueger . |
| 4,377,050 | 3/1983 | Renholts . |
| 4,377,616 | 3/1983 | Ashcraft . |
| 4,379,806 | 4/1983 | Korpman . |
| 4,380,567 | 4/1983 | Shigemoto . |
| 4,386,135 | 5/1983 | Campbell . |
| 4,389,450 | 6/1983 | Schaefer . |
| 4,393,115 | 7/1983 | Yochii . |
| 4,398,985 | 8/1983 | Eagon . |
| 4,402,172 | 9/1983 | Krueger . |
| 4,405,401 | 9/1983 | Stahl . |
| 4,407,897 | 12/1983 | Farrell . |
| 4,410,582 | 10/1983 | Tsunashima . |
| 4,424,256 | 1/1984 | Christensen . |
| 4,425,410 | 1/1984 | Farrell . |
| 4,429,015 | 1/1984 | Sheptak . |
| 4,438,175 | 3/1984 | Ashcraft . |
| 4,463,861 | 8/1984 | Tsubone . |
| 4,464,443 | 8/1984 | Farrell . |
| 4,472,227 | 9/1984 | Toyoda . |
| 4,513,050 | 4/1985 | Akao . |
| 4,517,044 | 5/1985 | Arnold . |
| 4,522,887 | 6/1985 | Koebisu . |
| 4,525,416 | 6/1985 | Hammerschmi . |
| 4,528,055 | 7/1985 | Hattemer . |
| 4,529,654 | 7/1985 | Drum . |
| 4,544,590 | 10/1985 | Egan . |
| 4,551,380 | 11/1985 | Schoenberg . |
| 4,558,082 | 12/1985 | Eckberg ............................ 427/517 |
| 4,568,403 | 2/1986 | Egan . |
| 4,581,262 | 4/1986 | Karabedian . |
| 4,582,736 | 4/1986 | Duncan . |
| 4,582,752 | 4/1986 | Duncan . |
| 4,582,753 | 4/1986 | Duncan . |
| 4,585,679 | 4/1986 | Karabedian . |
| 4,617,241 | 10/1986 | Mueller . |
| 4,626,455 | 12/1986 | Karabedian . |
| 4,626,460 | 12/1986 | Duncan . |
| 4,643,789 | 2/1987 | Parker et al. ........................... 156/233 |
| 4,650,721 | 3/1987 | Ashcraft . |
| 4,673,611 | 6/1987 | Crass . |
| 4,680,234 | 7/1987 | Kelch . |
| 4,702,954 | 10/1987 | Duncan . |
| 4,713,273 | 12/1987 | Freedman . |
| 4,716,068 | 12/1987 | Seifried . |
| 4,724,186 | 2/1988 | Kelch . |
| 4,728,571 | 3/1988 | Clemens . |
| 4,780,364 | 10/1988 | Wade . |
| 5,151,309 | 9/1992 | Dollinger . |
| 5,242,650 | 9/1993 | Rackovan et al. ..................... 264/171 |

OTHER PUBLICATIONS

Opticite Label Film 330, information sheet, Copyright 1985, The Dow Chemical Company, Form No. 500–1047–85.

Opticite Label Film 410, information sheet, Copyright 1985, The Dow Chemical Company, Form No. 500–1049–85.

Opticite Label Film XU 65006.06, information sheet, Copyright 1985, The Dow Chemical Company, Form No. 500–1048–85.

Opticite Soft Drink Label Film, information sheet, Copyright 1985, The Dow Chemical Company, Form No. 500–1050–85.

Opticite Soft Drink Label Film, information sheet, Copyright 1984, The Dow Chemical Company, Form No. 500–1054–84.

Printing on Opticite Polystyrene Films, brochure, The Dow Chemical Company, Form No. 500–1076–85.

Supplier Information for Users of Opticite Films, information sheet, The Dow Chemical Company, Form No. 500–1081–85.

Commercial Dialogue, Apr. 30, 1984, "Coca–Cola and Pepsi Test Dow's Label Film".

Printing Trycite Plastic Films, brochure, Copyright 1982, The Dow Chemical Company.

Bicor Communication, Oppalyte Observations, brochure, Jul. 1, 1983, Mobil Chemical Films Division.

Hercules WT503, WT502/1S and WT502/2S, product bulletin Hercules Incorporated, FC–17G.

Micafil 40, information sheet, DuPont Canada, Inc.

Opportunities and Requirements for Coextruded Beverage Bottle Labels, Paper by Michael C. Paddock at 1985 Coextrusion Conference, pp. 85–98.

Proprietary Information Disclosure Agreement between Avery International Corporation and Package Products Co., dated Feb. 14, 1984.

Satas, D., *Handbook of Pressure Sensitive Adhesive Technology*, Van Nostrand Reinhold Company, New York, 1982.

LABELLING OF SUBSTRATES

This invention relates to the conformable labelling of flexible and rigid substrates such as squeeze bottles, glass bottles and the like, and to facestock and carriers for use in such methods.

BACKGROUND OF THE INVENTION

It has long been known to manufacture and distribute pressure-sensitive adhesive stock for labels by providing a layer of face or facestock material for the label or sign backed by a layer of pressure-sensitive adhesive which in turn is covered by a release liner or carrier. The liner or carrier protects the adhesive during shipment and storage. The liner or carrier also allows for efficient handling of an array of individual labels after the labels are die-cut from the layer of facestock material and up to the point where the individual labels are dispensed in sequence on a labelling line. During the time from die-cutting to dispensing, the liner or carrier remains uncut and may be rolled and unrolled for storage, transit and deployment of the array of individual labels carried thereon.

In many label applications, it is desirable that the facestock material be a film of polymeric material which can provide properties lacking in paper, such as durability, strength, water resistance, abrasion resistance, gloss and other properties. Heretofore, facestock material of thicknesses greater than about 3 mils have been used in order to assure dispensibility in automatic labelling apparatus. However, it is desirable to reduce the thickness or "down-gauge" the facestock material in order to attain savings in material costs. Previously, such reduction in label thickness has resulted in reduced stiffness and the inability to dispense the labels in a reliable commercially acceptable manner using automatic machinery. One standard of dispensibility requires dispensing rates of about 200 units per minute for an average size label of about 3½"×5" and less than about 5% failure. In some applications, the customer may require an even lower fail rate, e.g. less than 1%.

Failure to reliably dispense is typically characterized by the label following the carrier around a peel plate without dispensing or "standing-off" from the carrier for application to the substrate. Such failure to dispense is believed to be associated with excessive release values, measured as disclosed below, between the label facestock material and the liner, and the maximum workable release level is dependent upon the stiffness of the facestock. Failure to dispense may also be characterized by a folding of the label due to lack of label stiffness at the dispensing speed as it is transferred from the carrier to the substrate. Another particular need in many labelling applications is the ability to apply polymeric-film labels at high line speeds, since to increase line speed has obvious cost-saving advantages.

In the prior art, one useful polymeric material is biaxially-oriented polypropylene ("BOPP") which is relatively inexpensive and dispenses well but is not usable on squeezable bottles and other flexible substrates. Such films tend to have sufficient stiffness for dispensing, but they also have relative high tensile modulus values, e.g. 100,000 psi or greater, which results in unacceptable conformability characteristics. Another useful material is unoriented blown-film polyethylene that is also relatively inexpensive and is usable on squeezable bottles and the like, but is difficult to die cut consistently and dispenses very poorly. In this instance, it is believed that the stiffness is not sufficient for reliable dispensing. In general, in the prior art, polymeric-film labels have not been entirely satisfactory in die-cut label applications, particularly those involving polymeric-film materials less costly than "vinyl", i.e. polyvinyl chloride (PVC). For example, down-gaging of polymeric-film labelling stock for improved economy has been inhibited by dispensing problems and the speed of label application lines has been limited when applying polymeric-film labelling stock less costly than PVC but still otherwise suitable for die-cut labels used on squeeze bottles or other flexible or deformable substrates. Polymeric-film label stock that is otherwise economically attractive and that is suitable for high speed dispensing has not lent itself to the labelling of flexible substrates, and polymeric-film stock that is otherwise economically attractive and that is suitable for labelling of flexible substrates has not been dispensable at high line speeds.

Related conformability problems have been encountered in respect to rigid substrates such as provided by glass bottles, especially clear glass bottles. More particularly, the suggested use of biaxially oriented film to label a glass bottle was unsuccessful due to the tendency of the relatively stiff label to bridge surface depressions resulting from the bottle forming process and to result in an undesirable surface appearance simulating a trapped air bubble. This has impeded the use of pressure-sensitive adhesive labels to replace prior glass bottle labelling techniques such as ceramic ink directly bonded to the bottle surface during the glass blowing process. Such ceramic ink techniques are environmentally undesirable due to objectional ink components and the contamination by the ink of the crushed bottle glass in recycling processing.

The heat-set labels contemplated by the methods of the present invention and the die-cut label applications to which the present invention relates are to be contrasted with shrink-films, consisting of stretched, unannealed films, sometimes used in sleeve-labelling applications wherein a sleeve or wrap of shrink film is placed around the circumference of a bottle or can or like container and heated to cause it to shrink into light, surrounding engagement with the container. Examples of the latter are found in U.S. Pat. Nos. 4,581,262 and 4,585,679. The tendency to shrink causes such film to tend to withdraw from any borders, tending to leave exposed adhesive, a particular disadvantage in die-cut label applications since exposed adhesive is unsightly and tends to catch dust.

THE PRESENT INVENTION

The present invention opens the way to substantial cost savings in the manufacture of polymeric-film facestocks while at the same time maintaining the desirable characteristics of the film facestocks which have been used prior to this invention.

In particular, the present invention opens the way to labelling of flexible and rigid substrates with relatively thinner or down-gauged polymeric-film label materials with reliable dispensing and acceptable conformability properties. To that end, the polymeric-film materials are used in combination with carriers or liners having reduced release values. In this manner, conformable labelling of flexible or deformable substrates such as plastic containers and rigid substrates such as glass bottles is achieved using the down-gauged polymeric-film label materials of the invention.

The invention involves the discovery or insight that providing heat-set down-gauged polymeric films with relatively low stiffness (with corollary generally high stretchability or conformability) in only the cross-direction (CD) allows acceptable overall conformability in many flexible and rigid substrate applications when using heat-set polymeric materials of lower inherent conformability than PVC, such as heat-set polyethylene, polystyrene, polypropylene, ethylene vinyl acetate (EVA), and copolymers and mixes thereof, provided that the substantially higher stiffness (and hence generally lesser stretchability and conformability) in the machine direction (MD) is not at too high a level. Also important is an additional insight: that the latter "not too high a level" can at the same time be high enough to allow high speed dispensing of the heat-set labels providing that the relatively low stiffness in the cross-direction is not too low.

Put another way, through provision of proper differential between machine direction stiffness and cross-direction stiffness, with the latter the lower of the two, and the selection of the proper release level, a heat-set down-gauged differentially stiff film can accomplish dispensing at higher line speeds than previously achieved for the same thickness of a non-oriented film in many substrate applications, while at the same time exhibiting acceptable overall conformability to the flexible or rigid substrates even though the film has less inherent conformability than PVC. A differentially-stiffened film in accordance with the invention thereby enables a higher stiffness in the machine direction and better dispensibility than is achievable with a similar non-oriented film of the same caliper. It is also believed that differentially-stiffened films have a higher effective stiffness at high speeds than a non-oriented film of the same Gurley value. The differentially-stiffened films have provided dispensing speeds in the range of 200 units/minute and higher for non-butt cut labels having a 3½"× 5" size.

Mounted labels formed from prior-art heat-set biaxially oriented films which lack sufficient conformability for flexible substrate applications typically exhibit wrinkling or "channelling" after the substrate, such as a squeezable bottle, is squeezed and then released. With the bottle in an upright position, the wrinkles or "channels" typically extend horizontally inward from each side edge of the label, and are widest at the side edge, becoming progressively narrower as they extend inwardly to a point at which they disappear. In other words, the wrinkling or "channeling" appears to have a characteristic of directionality.

In accordance with the invention, the down-gauged labels have a reduced occurrence of such wrinkling or channeling. For example, satisfactory conformable labelling of flexible or deformable substrates has been indicated by customer acceptance of a 2.75"×6" panel label for an oval shaped plastic squeeze bottle, 15 ounce size, of VIBRANCE by Helene Curtis or a 5.75"×4" label for a cylindrical shaped plastic bottle, 12 ounce size, of saline solution by Bausch & Lomb.

As used herein, "conformable labelling" (or "label conformability") also contemplates acceptable labelling of rigid substrates such as glass with a label of sufficient flexibility to accommodate irregular or undulating glass surface characteristics resulting from the glass manufacturing process. An overly stiff label film, such as a biaxially oriented film, tends to result in labels which bridge the depressions in the glass surface so as to appear as trapped air between the label and glass surface.

Satisfactory conformable labelling of a rigid glass substrate has been accomplished with a 2.75"×3.25" label for a tapered shaped glass bottle, 11 ounce size, of flavored bottled water by Clearly Canadian Beverage Corp.

The thinner or down-gauged facestock materials of the invention are provided with a preselected differentiation in stiffness as between the machine direction (MD) and the cross-direction (CD) as indicated above. In the illustrated embodiments, the stiffness differential is provided by hot-stretching and heat-setting the facestock material using techniques taught in applicant's U.S. Pat. No. 5,186,782 which is assigned to the assignee of this application and whose teachings are incorporated herein by reference. The step of hot-stretching includes selecting a differentiation between hot-stretching in the machine direction and cross-direction such that the degree of hot-stretching stiffens the heat-set film to an MD stiffness greater than about 10 Gurley, and, for example, in the range of between about 10 and 60. (Stiffness is measured per TAPPI Gurley stiffness test T-543.) In the case of the down-gauged facestock materials of interest herein, the MD stiffness is more typically between about 10 to 20 Gurley or higher, and more typically, in the range of from about 15 to about 20 Gurley or less.

Label facestock films of stiffness less than about 20 Gurley were not previously dispensible in a reliable or commercially acceptable manner using automatic labelling machines. It has now been found that polymeric release systems may be provided with sufficiently low release values to enable reliable dispensing of label facestock having a stiffness less than 20 Gurley. More particularly, conformable labels having Gurley values ranging from about 10 up to about 20 may be reliably dispensed from carriers having an average release value of about 45 grams/2 inch width and a range of release values of from 10 to 80 grams/2 inch width. (Release being measured using Fasson Test Method 8-A wherein a 2"×10" sample is peeled by stripping the carrier from the facestock at a 90° angle and at a peel rate of 400 inches per minute.) For example, acceptable dispensing has been achieved with 100% solids polymeric release systems having an average release value of about 45 grams/2 inch width with values ranging from about 10 to about 80 grams/2 inch width. The range of release values results from variations in the reproducibility of the specific liner construction, release polymer and its application to the carrier, and the processing variances in making the label and liner combination. However, it is an important consideration that the release values are consistently less than 80 grams/2 inch width. Similar average release values and ranges of release values may be obtained with solvent release polymer systems.

Preferred 100% solids polymer systems comprise radiation cured silicones. Radiation curing utilizes radiation to alter the physical and chemical nature of the release coating material and, more particularly, interaction of the radiation with organic substrates to develop cross-linked or solvent-insoluble network structures. The forms of radiation energy pertinent herein include high energy electrons as in electron bombardment (EB) processes and nonionizing radiation such as associated with ultraviolet (UV) processes.

An important insight of this invention is that differentially-stiffened films provide improved dispensibility as compared with non-oriented films of similar composition and caliper, and that reliable dispensibility may thereby be achieved in respect to thinner gauge films to effect cost savings.

Reduced overall levels of release and increased uniformity of release for various label dispensing speeds in combination with differential label stiffness has facilitated the use of down-gauged labels in accordance with the invention. The lower Gurley stiffness of down-gauged films, e.g. 2 to 3 mils thick, has been accommodated by the release values in accordance with the invention.

The differentially stiffened facestock label films of the invention have been found to more easily die cut as compared with films of the same material which are not oriented. More particularly, the die cutting provides more sharp and distinct cuts with full separation of the label along the cut label edge being achieved at a lower die-cutting pressure. This tends to reduce the possibility of cutting the silicone release layer and the sticking or welding of the adhesive to the cut edges so as to impede dispensing and the clean separation of the label from the liner. Such adhesive sticking and/or deeper cutting with compression or crushing of the adhesive into the cut may inhibit the initiation of peel of the label as the carrier travels around the peel plate. Even though the release level may not be affected, this edge phenomenon may inhibit peel initiation and promote the occurrence of dispensing failure.

The 100% solids or radiation cured release systems of the invention are useful with carriers formed of plain kraft paper, polycoated kraft paper and polymeric materials such as polyester. In each case, it is possible to obtain reduced release values as compared with prior art solvent systems. As compared with plain paper, the polycoated kraft paper, e.g. 14 lbs. of polypropylene uniformly coated on the machine finished surface of a 30 lb./ream kraft paper, provides a particularly preferred carrier since it has a high shatter or tear strength which is useful in high speed processing. Moreover, the release surface is more uniform and less legging of adhesive is observed during separation. Polymeric carriers such as polyester provide further improvements in reduction and uniformity of release as well as shatter or tear strength but they are relatively more expensive.

A further insight in accordance with the invention involves the clarification of the relationship between tensile modulus and conformability. More particularly, if the tensile modulus is significantly greater than about 100,000 psi in either the MD or the CD direction, a lack of conformability tends to occur in the labelling of deformable or rigid substrates as discussed above.

Another insight important to the invention in its preferred aspects is the desirability of a certain orientation between relatively moving (1) labels formed from a heat-set film of differential stiffness and being dispensed or off-fed at a labelling station, and (2) bottles or other workpieces receiving labels at the labelling station and having surfaces of simple curvature and an axis or axes of curvature that is vertical when the workpiece is upright (this is typical of squeezable containers whether formed as cylindrical bottles or "front and back panel" bottles), the orientation being such that as heat-set labels are dispensed onto workpieces, the cross-direction, or direction of relatively low differential stiffness, of the portion of film forming each label is parallel to the axis or axes of curvature of the workpieces.

In one particular aspect, the invention provides an improved way of manufacturing labels formed from relatively low-cost heat-set unilayer films, and specifically polyethylene, thereby enabling the manufacture of an improvement on the type of product illustrated in the prior art in U.S. Reissue Pat. No. 32,929 to Ewing.

Substantially uniaxial hot-stretching has previously been practiced in the manufacture of adhesive-coated multilayer stock for "shrink" labelling around the circumferential extent of workpieces such as bottles or cans. The stiffness of such material in the machine direction must be sufficient to allow the material to unroll properly, and the uniaxial hot-stretching presumably incidentally provides a difference in stiffness in machine and cross-directions. However, such multilayer "shrink" films are hot-stretched for the purpose of providing the desired shrinking action, and are not heat-set and dimensionally stable when they are fed to the workpieces. The procedures used are not suitable for labelling with labels die-cut from heat-set film materials, and generally would not perform satisfactorily on workpieces having flexible substrates. Examples are found in U.S. Pat. Nos. 4,828,928 and 4,879,177.

DESCRIPTION OF THE PREFERRED EMBODIMENT

Figure 1A:
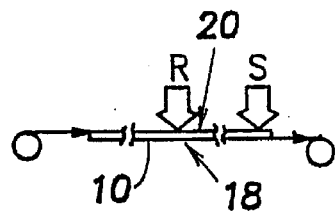
FIGS. 1A–1E schematically illustrate certain manufacturing steps related to the environment of the invention.
Figure 1B:
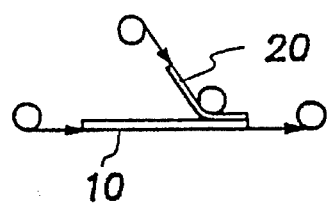

In the manufacture of label stock according to the invention, liner or carrier stock 10 (FIG. 1A–1E) may be provided. The liner or carrier stock 10 may comprise a multilayer liner made for example as disclosed in U.S. Pat. No. 4,713,273, the disclosure of which is incorporated herein by reference, or may be conventional liner or carrier consisting of a single paper or film layer which may be supplied in roll form. If it has not been previously provided with a release coating and does not itself include components to inherently generate a release surface at its adhesive-contacting face, the liner or carrier 10 may be coated with a release coating at station R, as shown in FIG. 1A. If a release coating is applied, it is dried or cured following application by any suitable radiation or thermal means (not shown) as are well known in the art. If the liner or carrier 10 comprises a plastic extrudate, then prior to application of the release coating at station R, the formed films may be hot-stretched to provide machine direction orientation of the liner or carrier 10.

The release face of the release liner or carrier may be coated with a layer of pressure-sensitive adhesive for subsequent transfer of the adhesive to the facestock with which the liner or carrier is employed. When the facestock is combined with the liner or carrier, the adhesive is joined to the facestock. Later, the liner or carrier is removed to expose the adhesive, which now remains permanently joined to the facestock.

Thus, as indicated in FIG. 1A, adhesive may be applied at station S following drying or cure of the release coat previously applied at station R. This may be a tandem coating operation, or the adhesive coating may be on a separate coating line. Or, the adhesive may be applied at some later time prior to the combining of the release liner or carrier 10 with facestock. The combining of the liner or carrier with a facestock 20 is diagrammatically illustrated in FIG. 1B. Alternatively, the adhesive may be coated directly on the facestock 20 prior to the combining of the face stock and liner or carrier.

In some applications, the adhesive may be a heat-activated adhesive or a hot-melt adhesive, as distinguished from a pressure-sensitive adhesive, in which case there may be no need for the provision of a release coating or inherent releasability such as is required when using a pressure-sensitive adhesive.

Figure 1C:
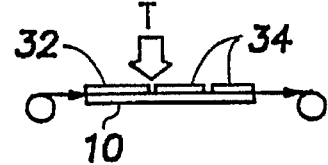
Figure 1D:
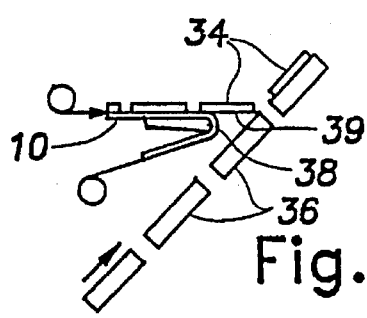
Figure 1E:
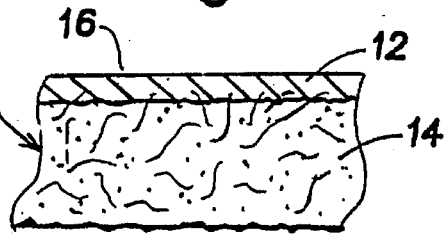

FIG. 1C diagrammatically illustrates the die-cutting of the facestock 20, at a station T, into a series of spaced pressure-sensitive labels 34 carried by the release liner or carrier 10. This step may be performed by rotary cutting dies in a well known manner and involves the stripping of the ladder-shaped matrix (not shown) of waste or trim surrounding the formed labels when they are die cut (the "rungs" of the ladder representing the spacing between successive labels). The labels then remain on the liner in spaced relation with each other, as shown. Or, the die cutting may be a butt-cutting operation in which the labels are not spaced, but remain adjacent each other, although disconnected, following die-cutting (and the matrix of waste material is "rungless"). FIG. 1D illustrates the application of the labels 34 to passing workpieces 36 by use of a peel-back edge 38 to dispense the labels 34 by progressively removing the liner or carrier from them to thereby expose the adhesive side 39 of the labels and project the labels into contact with passing workpieces 36.

In the context of the present invention, the workpieces 36 may constitute plastic squeeze bottles or other articles which are flexible in nature and therefore require labels that avoid or minimize the natural tendency of labels that are adhered to such objects to wrinkle upon flexing of the substrates. The workpieces 36 may also comprise glass bottles or other rigid articles tending to have an irregular surface and therefore require labels that are flexible and tend to closely adhere to the surface without bridging local surface depressions.

Figure 2:
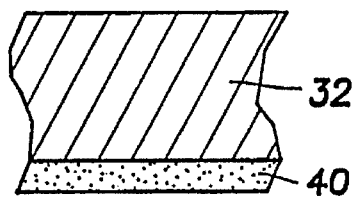
FIGS. 2–7 are a fragmentary cross-section of various facestock constructions usable in the practice of the invention.

FIG. 2 diagrammatically illustrates a single-layer facestock 32 with pressure-sensitive adhesive 40 permanently combined therewith. Such facestock could be employed as the facestock 20 in the methods or procedures at the stage illustrated at the right end of FIG. 1B or the left end of FIG. 1C. At this stage, the adhesive 40 (not shown in FIGS. 1A to 1D) may be releasably carried on the liner or carrier 10 (on or with which it may have been previously coated or combined, as by the previously mentioned coating step at station S). Alternatively, the adhesive 40 may have been directly coated on or combined with the facestock 20 prior to the combining of the facestock with the liner or carrier 10.

It will be understood that the operations shown in FIGS. 1A to 1D may be done at different locations by different manufacturers, or they may be combined. For example, the steps of FIG. 1A may be performed by a liner and adhesive manufacturer, the steps of FIGS. 1B and 1C may be performed by a label manufacturer on one continuous pass rather than being interrupted by a wind/unwind sequence as illustrated, and the steps of FIG. 1D may be performed by a packager of manufactured products.

Facestock which is formed into labels is usually wound and unwound in roll form, and is therefore one form of what is known as "roll stock" or "roll facestock", and the accompanying liner or carrier is called "roll liner".

The single-layer facestock material may comprise for example low, medium or high density polyethylene. The enhancement of the performance of labels made from such facestock is an important aspect of the invention, and will be discussed more fully below.

Figure 3:
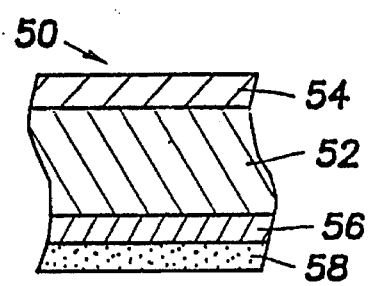
Figure 4:
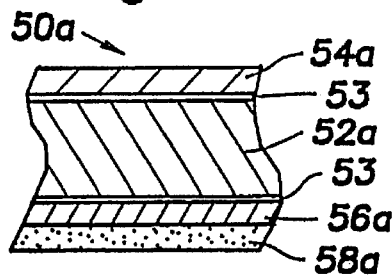

Examples of multilayer film facestocks which may be used in the invention are described in U.S. Pat. No. 4,713,273, mentioned above, and illustrated herein in FIGS. 3–7. In FIG. 3, a multilayer web construction, generally indicated by the reference numeral 50, comprises a coextrudate including a core layer 52, a skin layer 54 on the faces side of the coextrudate, and a skin layer 56 on the inner side of the coextrudate opposite the face side. Combined on the inner side of the coextrudate is a pressure-sensitive adhesive layer 58. In FIG. 4, a multilayer web construction, generally indicated by the numeral 50a, comprises layer 52a, 54a, 56a and 58a generally corresponding to the layers 52, 54, 56 and 58 in FIG. 3. However, in FIG. 4, tie layers 53 join the core layer 52a to the skin layers 54a and 56a.

The coextrudate of FIGS. 3 and 4 comprise polymeric-film materials, are formed by simultaneous extrusion from a suitable known type of coextrusion die, and are adhered to each other in a permanently combined state to provide a unitary coextrudate. The FIG. 3 construction is used when the materials of the core and skins are such that these layers firmly adhere or bond to each other when coextruded as adjacent film layers. The FIG. 4 construction, with the tie layers 53, is used when the core and skin materials do not sufficiently adhere or bond to each other when they are extruded together.

The presently preferred materials for skin and core layers comprise physical blends of (1) polypropylene, polyethylene, their copolymers, or blends thereof and (2) ethylene vinyl acetate (EVA) in weight ratios ranging from 50/50 to 90/10.

Another material for the core or skin layers is polyethylene of low, medium or high density between about 0.915 and 0.965 specific gravity.

Inorganic fillers may be used to provide opaque film label stock. Useful fillers include calcium carbonate, titanium dioxide and blends thereof.

A presently preferred material for the core layer 54 for clear film label applications is a physical blend of (1) a copolymer of polypropylene and polyethylene and (2) ethylene vinyl acetate (EVA). For opaque film label applications, a presently preferred core layer is a physical blend of polypropylene and EVA, filled with a mixture of calcium carbonate and titanium dioxide.

A presently preferred material for the skin layers 54 and 56 is a physical blend of polypropylene and EVA for both clear and opaque label film applications. Another material for the skin layers is polyethylene vinyl acetate. The skin layers may be identical or differ in composition. For example, polyethylene vinyl acetate might be the material used for the outer skin, but polyethylene acrylic acid might be used for the inner skin for better anchorage to, say, an acrylic adhesive of choice.

Other materials for the skin layers include meltable film-forming substances used alone or in combination, such as polyethylene, polyethylene methyl acrylic acid, polyethylene ethyl acrylate, polyethylene methyl acrylate, acrylonitrile butadiene styrene polymer, polyethylene vinyl alcohol, nylon, polybutylene, polystyrene, polyurethane, polysulfone, polyvinylidene chloride, polypropylene, polycarbonate, polymethyl pentene, styrene maleic anhydride polymer, styrene acrylonitrile polymer, ionomers based on sodium or zinc salts of ethylene/methacrylic acid, polymethyl methacrylates, cellulosics, fluoroplastics, polyacylonitriles, and thermoplastic polyesters.

Figure 5:
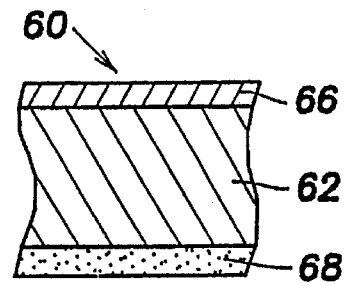

While the foregoing examples of facestocks have employed skin layers on each side of the core, there are instances where a skin layer is employed only on the outer side of the construction, such as the construction 60 shown in FIG. 5, which employs the single skin layer 66 on the outer side of a core layer 62. In this instance, the pressure-sensitive adhesive layer 68 is directly adjacent the core layer.

Figure 6:
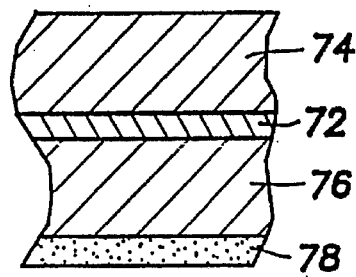
Figure 7:
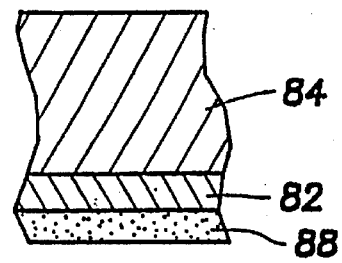

Still other multilayer constructions may be employed according to the present invention. For example, as shown in FIG. 6, the film may comprise a relatively thin core layer 72 made of a material which is so stiff that the core layer contributes the majority of the stiffness of the composite film or at least contributes significantly thereto, even though the core layer represents only a small fraction of the total thickness of the film. Relatively thick skin layers 74, 76 are provided on the other and inner sides of the core layer, as shown in FIG. 6, or the film may even comprise only a core layer 82 with a single skin layer 84, as seen in FIG. 7. A layers 78 or 88 of pressure-sensitive construction is combined with the construction, as seen. Additional tie layers (not shown) may also be provided where film incompatibility calls for the same, similarly to the provision of tie layers 53 in the facestock of FIG. 4, or the material of the thicker layer or layers may be "doped" with enough of the material of the thinner core layer to promote good bonding of the layers, or other bond-promoting arrangements may be used.

A candidate material for the thin stiff core layer 72 is polystyrene, which is capable of providing the majority of film stiffness when used in conjunction with far more flexible outer layer materials, such as polyethylene of low, medium or high density which are "doped" with sufficient polystyrene to provide a good bond. These outer layer materials may be provided with additional additives to promote printability as required.

From a method standpoint, one or more charges of film-forming resin may be extruded or coextruded to form an extrudate. Thus, one or more charges may be prepared for extrusion or coextrusion through a coextrusion die 70 and flat film casting, as schematically illustrated in FIG. 8A, the extruded film is cast on a first cooling roll 191, continues around a second cooling roll 192, and is advanced by pull-off rolls 193.

Figure 8A:
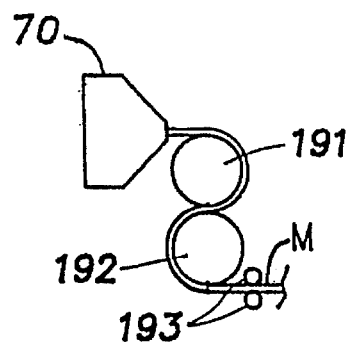
FIGS. 8A–8C schematically illustrate cast-film extrusion and ensuing line processes pertinent to the invention.
Figures 8B, 8C:
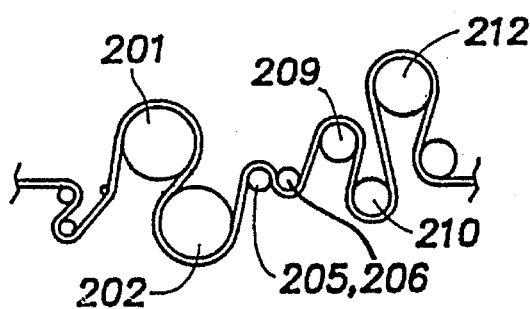

FIG. 8B illustrates a hot-stretching station at which the Gurley stiffness of the flat stock M is increased in the machine direction. After passing around a pair of pre-heat rolls 20-1, 202 which heat the stock above its glass transition temperature, the stock is stretched at the reach between the pre-heat rolls and the pull-roll pair 205, 206, the latter rotating at a multiple of the speed of the pre-heat rolls, corresponding to the stretch ratio, say 5 to 1. The stock then passes over the annealing rolls 209, 210 at which it is annealed or heat-set, and finally passes over the chill roll 212 to complete the hot-stretch operation. The stock may then be taken up in roll form as seen in FIG. 8C.

Multilayer facestock constructions that include tie layers may be formed by coextruding the tie layers along with the other film layers.

Figure 9:
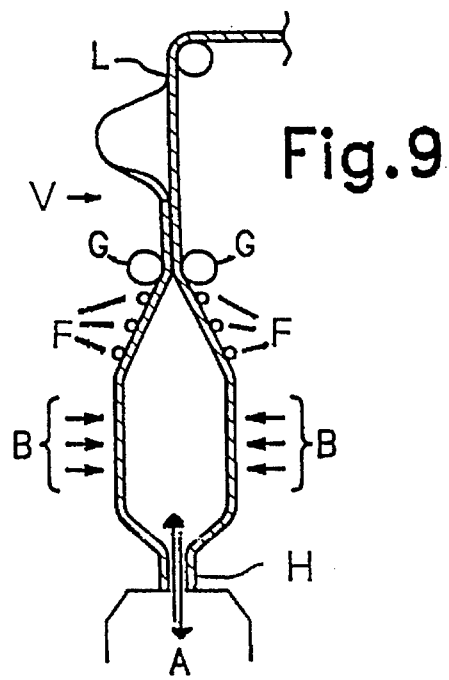
FIG. 9 schematically illustrates blown-film extrusion and ensuing line processes pertinent to the invention.

Rather than extruding the multilayer facestock films or webs described above through cast film extrusion, that is, through flat dies as schematically indicated in FIG. 8A, the charge or charges for the one or more layers can in a known manner be extruded or coextruded by blown film extrusion, that is by extrusion (preferably vertically) through circular dies, one of which is shown schematically in FIG. 9, so that the molten facestock extrudate H coming out of the die has an initially thin-stemmed hollow cylindrical shape (shown in cross-section) rather than a flat shape. In blown film extrusion, the initially thin-stemmed molten shape is blown out at a vertical location and to a degree determined by process conditions, and freezes in its expanded condition to thereby become transformed into a tubular shape of considerably increased diameter, as indicated in FIG. 9. the soft extruded cylindrical shape is supported and caused to expand by air fed through the central portions of the die into the interior of the shape. This air may be recirculated back through the die to provide a constant supply of cool air, thereby accomplishing "internal bubble cooling" of the extruded material, as indicated by the arrows A. Cooling may also be provided by air directed from nozzles surrounding the exterior of the cylinder, as indicated by the arrows B.

In such blown film extrusion operations, the cooled stock may be flattened from its tubular shape as by passing between guide rolls F and the nip of driving pinch rolls G which increase the rate of vertical travel of the film so that hot stretching in the machine direction occurs or is increased on the approach side of the rolls G. The film may then be slit on one side and unfolded into a single flat layer L, as indicated schematically beginning at station V in FIG. 9. The film may then be heat-set or annealed in a manner similar to that illustrated in the right hand portion of FIG. 8B, and then taken up in roll form in a manner similar to that illustrated in FIG. 8C.

It will be understood that when blown film extrusion is used in the practice of the invention, a significant portion of stretch in the machine direction occurs while the film is below its melting point (and above its glass transition temperature), for example by reason of rapid take-up by the rolls G, to thereby hot-stretch the film in the machine direction, and hot-stretching in the machine direction always exceeds such hot-stretching, if any, as occurs in the cross-direction, so that there is always a differential favoring the machine direction in the hot-stretching of the film, with the result that the film is preferentially stiffened in the machine direction, and has a relatively low stiffness in the cross-direction. In other words, hot-stretching in the cross-direction may or may not occur, but in any event if there is any degree of hot-stretching in the cross-direction, that degree will be exceeded by the degree of hot-stretching in the machine direction, leaving the film in the cross-direction with a relatively low degree of stiffness.

All the techniques and all the single-layer or multilayer films described above may be used in the practice of the invention in one or the other of its aspects. According to either the single-layer or multilayer film aspect of the invention, the extruded film is differentially treated in the machine and cross-directions, as by hot-stretching in the machine direction but not in the cross-direction, or by hot-stretching more in the machine direction than in the cross-direction, or by otherwise differentially treating the film with respect to its machine and cross-direction, so that in the machine direction the film has sufficient stiffness to allow it to dispense properly past a peel plate or peel-back edge, over which the liner is stripped, at high speeds, i.e. in excess of 200 pieces per minute and up to about 250 pieces per minute which corresponds with a speed of about 80 to 100 feet per minute. Preferably, dispensing can occur at a rate of at least 500 pieces per minute, and more preferably at 550 pieces per minute or higher, while the stiffness in the film in the cross-direction is substantially less than that in the machine direction and is compatible with overall conformability of the facestock on a flexible substrate. As a result, the facestock is both dispensable at a high rate and usable in flexible and rigid substrate applications.

According to the invention, the stiffness in the machine direction should be from about 10 Gurley to about 60 Gurley, and preferably at least 30 Gurley, and even more preferably in the mid-thirties in Gurley value. The stiffness in the cross-direction should be substantially less, so that the Gurley value in the cross-direction is less than 0.75 times the machine direction Gurley, or more preferably less than 0.6 times the machine direction Gurley, or even more preferably less than 0.5 times the machine direction Gurley. In general, at a given Gurley value in the machine direction overall conformability tends to increase as the ratio of cross-direction Gurley to machine direction Gurley becomes smaller. However, if the ratio becomes too small, dispensability will be adversely affected. Even though a film may have a relatively high Gurley value in the machine direction, too small a Gurley value in the cross-direction allows the film to tend to collapse transversely as the film passes the peel-back edge, to a point where dispensability becomes unreliable.

The foregoing ranges of Gurley values are generally achievable in the film thicknesses that are typical of labelling applications, say 2 to 4 mils.

The "front and back panel" bottles or workpieces have front and back panels that are surfaces of simple curvature, the axes of curvature of which are vertical when the workpiece is upright. In accordance with the preferred practice of the invention it is to be noted that the workpieces 36 are fed past the labels being dispensed in such a manner that the direction of relatively low stiffness of the labels, i.e. the cross-direction of the line in this instance, is parallel to the axes of curvature of the workpieces, which are therefore seen end-on in FIG. 1D. This is the preferred orientation from the standpoint of maximizing label conformability.

The following Examples 1–4 illustrate the invention in connection with label facestock materials and labels having a thickness greater than about 3.0 mils.

In one example of the invention (Example 1), a non-chlorine-containing facestock film was formed by a cast film extrusion as illustrated in FIG. 8A, and was then heated, stretched in the machine direction only, and heat-set or annealed, as illustrated in FIG. 8B. The final overall thickness of the film was 3.5 mils. The particular film as formed comprised a core layer 2.8 mils thick of a physical blend of (1) a copolymer of polypropylene and polyethylene and (2) EVA, and skin layers each 0.35 mils thick of a physical blend of polypropylene and EVA. A draw ratio of 5:1 was used, so that hot-stretching in the machine direction was 5:1 while there was essentially no stretching in the cross-direction, resulting in a Gurley stiffness for the heat-set film of 35 in the machine direction and 15 in the unstretched cross-direction. The film was combined with a psa-coated release liner in a manner similar to that shown in FIG. 1B, the adhesive thereby transferring to the film. Labels were die-cut from the film in a manner similar to that shown in FIG. 1C, leaving the labels spaced from each other as shown. The width of the labels was 2.25 inches extending in the machine direction and the height of the labels was 8 inches extending in the cross-direction. The stiffness of the film in the machine direction allowed the labels to be dispensed onto typical "front and back panel" squeeze bottles of 10 oz. size at a line speed of 500 bottles per minute (more than 8 per second), a very high labelling rate for labelling squeeze bottles or other flexible substrates. The bottles were 8.25 inches high and were approximately oval in cross-section, with a major diameter of 3.125 inches and a minor diameter of 2 inches. Despite the high speed dispensability of the labels, their relatively low Gurley in the machine direction (with corollary generally high stretchability or conformability) allowed them to continue to conform well when the bottles on which they were applied were squeezed and then released. The Gurley stiffnesses of 35 in the machine direction and 15 in the cross-direction for this example will be seen to be well within the ranges and relationships regarding stiffness values in the machine and cross-directions given above.

In a second example of the invention (Example 2), a core material was formed from the same blend as in Example 1, and under the same conditions and procedures, but with a proportion of EVA at the top of the preferred range mentioned above. Following hot-stretching and heat-setting, the Gurley stiffness was 30 in the machine direction and 15 in the cross-direction. Performance was satisfactory; the conformability of the film was slightly better and the dispensability slightly poorer than in Example 1.

In a third example of the invention (Example 3), a core material was formed from the same blend as in Example 1, and under the same conditions and procedures, but with a proportion of EVA 25% below the bottom of the preferred range mentioned above. Following hot-stretching and heat-setting, the Gurley stiffness was 40 in the machine direction and 18 in the cross-direction. Dispensability was good but the conformability of the film was not equal to that of the earlier examples. Overall performance was nevertheless passable.

In the fourth example of the invention (Example 4), another non-chlorine-containing facestock film was formed by cast film extrusion as illustrated in FIG. 8A, and was then heated, stretched in the machine direction only, and heat-set or annealed, as illustrated in FIG. 8B. The final overall thickness of the film was 3.4 mils. The particular film as formed comprised a core layer approximately 2.7 mils thick of a physical blend of polypropylene and ethylene vinyl acetate, together with calcium carbonate and titanium dioxide, and skin layers each about 0.35 mils thick of a physical blend of polypropylene and EVA. A draw ratio of 5:1 in the machine direction was used, with essentially no stretching in the cross-direction, resulting in the case of this film in a Gurley stiffness of 37 in the machine direction and 14 in the unstretched cross-direction. A release-coated liner and pressure-sensitive adhesive were provided, and the labels were die-cut as in the previous example, and to similar dimensions, and were formed as spaced labels that were similarly applied to workpieces of the shape previously described. Again, the stiffness of the film in the machine direction allowed dispensing of labels onto typical "front and back panel" squeeze bottles of 10 oz. size at a line speed of over 500 bottles per minute. Again, despite the high speed dispensability of the labels, they conformed well when the bottles on which they were applied were squeezed and then released. The Gurley stiffnesses of 37 in the machine direction and 14 in the cross-direction for this example will again be seen to be well within the ranges and relationships regarding stiffness values in the machine and cross-directions given above. Again, the preferred orientation between the direction of relatively low stiffness of the labels and the axis of curvature of the workpieces was maintained.

The foregoing examples demonstrate that relatively low stiffness (with corollary generally high stretchability and conformability) in only the cross-direction may accomplish acceptable overall conformability in flexible substrate applications, provided that the substantially higher stiffness (and hence generally lesser stretchability and conformability) in the machine direction is not at too high a level. The examples also demonstrate that the latter "not too high a level" can be high enough to allow high speed dispensing. As previously noted, the latter observation is subject to the proviso that the relatively low stiffness in the cross-direction not be too low.

Minimum stiffness values in the cross-direction necessary for dispensability have not been measured, but when poor dispensability is encountered in a particular set-up even though the Gurley value in the machine direction is, say, in the mid-thirties or high twenties, then if Gurley stiffness in the cross-direction is observed to be very low, dispensability can be achieved by raising the cross-direction Gurley, provided it is not raised so high as to produce a film unable to conform acceptably, as by passing the top limits for cross-direction Gurley specified above.

The following Examples 5–11 illustrate the invention in connection with label facestock materials and labels having a thickness less than about 3.0 mils. Comparative Example 1C is a control of slightly higher gauge. The constructions and test results in respect to these examples are summarized below in Table I.

In these examples, cast film extrusion facestock materials were prepared as described in connection with the prior examples, heated, stretched at a 5:1 ratio in the machine direction only and heat-set to provide differentially stiffened label facestock having a multilayer construction. White label films were prepared having an 80/20 thickness division between the core layer and the outer skin layers. The core layer comprised 5% polypropylene/maleic anhydride copolymer (POLYBOND PB 3001, a polymer produced by British Petroleum Company of Cleveland, Ohio) and 20–25% titanium dioxide concentrate (containing 50% polypropylene) with the balance being a random polypropylene copolymer. A skin layer was provided on each side of the core. The skin composition was 50% EVA, 40% polypropylene homopolymer and 10% of the above-noted compatibilizer. It was found that the abrasion resistance and stiffness of the film was improved by the addition of the compatibilizer.

In each of the following Examples 5–8, the carrier 10 (FIG. 1E) comprised a polycoated carrier having either a 14 lb./ream (44 PK) or an 11 lb./ream (41 PK) layer of polypropylene 12 roll coated on 30 lb./ream kraft paper 14 to provide a release surface 16. In Examples 5–8, the polypropylene layer 12 was applied to the rougher side of the kraft paper 14 opposite the machine finished side of the paper. In this manner, the resulting release surface 16 was more rough and tended to result in higher release values corresponding with the upper release limits. In Examples 9–11 and Comparative Example 1C, a 44PK carrier was used having the polypropylene layer roll coated on the smoother machine finished side of the kraft paper.

In Examples 5–8, the polypropylene surfaces of the carriers were offset gravure coated with a 100% solids release polymer and UV cured to provide a cured weight of about 0.5 to 1.0 grams/meters$^2$. The silicone release polymer is sold by The General Electric Company under the designation G9300. (In the case of EB curing, a suitable 100% solids polymer system is sold by the Goldschmidt Company under the designation GT 726/705) In Examples 9–11 and Comparative Example 1C, a tin catalyzed solvent borne silicone release solution was direct gravure coated onto the polypropylene surface of the carrier and thermally cured to provide a final cured coating weight of about 1.0 grams/meters$^2$. H. P. Smith Company provides a carrier having a pre-coated and thermally cured silicone release coating.

An emulsion acrylic pressure-sensitive adhesive layer having a weight of 21 grams/meters$^2$ was applied to each of the silicone release surfaces. In Comparative Example 1C, a slightly lower viscosity adhesive was used and slightly increased release values resulted.

The release properties reported in Table I were measured at room temperature and at a peel rate of 400 inches/minute. It is believed that the release values for Examples 5–8 were higher due to the use of the relatively rougher side of the carrier.

Each of the examples was successfully dispensed around a test peel plate at speeds up to 250 units per minute. The materials were also cut to provide labels having a size of 2.5"×4.75" and dispensed using an automatic labelling machine at speeds up to 150 units per minute. In both cases, the dispensing was deemed to be commercially acceptable with substantially no failures.

TABLE I

| EXAMPLE NUMBER | LINER | GAUGE (MILS) | GURLEY MD/CD | RELEASE G/2" WIDTH |
|---|---|---|---|---|
| 5 | 44PK | 2.5 | 18/10 | 76 |
| 6 | " | 2.25 | 15/9 | 85 |
| 7 | 41PK | 2.5 | 18/10 | 75 |
| 8 | " | 2.25 | 15/9 | 81 |
| 9 | 44PK | 2.5 | 18/10 | 44 |
| 10 | " | 2.25 | 15/9 | 42 |
| 11 | " | 2.25 | 15/9 | 44 |
| 1C | " | 3.5 | 35/15 | 50 |

As indicated above, an important aspect of the invention is the improvement of performance of labels made from a single-layer extrudate of the type diagrammatically illustrated in FIG. 2. Labels of this type are shown in U.S. Pat. No. RE. 32,929 to Ewing, the disclosure of which is incorporated herein by reference. Polyethylene or the other films therein specified, and specifically extruded polyethylene films having the ranges of values of thickness, density and tensile strength therein specified (ranges of tensile strength being taken to refer to the machine direction) can be formed by cast film extrusion or blown film extrusion. By way of specific example, a low or medium density polyethylene film may be employed having physical characteristics within the ranges of values specified by Ewing and also hot-stretched and heat-set to be within the parameters relating to stiffness values and relationships set forth in the present disclosure. Because of the enhancement accomplished by the single-layer film aspects of the present invention, acceptable performance may also be accomplished when extending either or both ends of the ranges specified by Ewing by as much as 0.005, 0.01 or 0.015 grams per cc in density, 0.5, 1 or 1.5 mils in thickness (but not below about 0.5 mil total thickness), and 20, 40 or (at the upper range end) 60 kilograms per square centimeter in tensile strength.

While hot-stretching is presently the preferable means of providing differential stiffness in a film, other methods are possible within the broader concepts of the invention, for example, grooving a cast film as by use of a serrated extrusion orifice, or by laser slitting that extends partly through the film, or by linearly perforating a formed film, or by other means. The terms "directionally-stiffening" and "differentially-stiffened" are used with reference collectively to such processes, of which hot-stretching is presently preferred. To the extent that elimination of hot-stretching also eliminates or minimizes the need to anneal or that-set the film, such step may be eliminated so long as the resulting film exhibits the characteristics of a heat-set or annealed film, i.e. is essentially devoid of "memory" of a pre-existing configuration to which a film tends to return under the influence of heat. The heat set differentially stiffened film of the present invention differ in this respect from "shrink" films of the prior art.

The foregoing description and claims generally describe the differential in stiffness in cast or blown films as favoring the machine direction as against the cross-direction, instead of vice versa. This is because probably it is most "natural" to dispense labels made of case or blown films in the machine direction of the extruded film, rather than in the cross-direction. However, when the machine direction for film formation and label dispensing are different, as when cast or blown film is stretched more in the cross-direction of the casting or blowing line than in the machine direction and labels cut from the film are thereafter dispensed in that cross-direction, or as when extruded film is grooved transversely to the direction of extrusion rather than in the direction of extrusion and dispensed in the direction of the grooves, then "machine direction" and "cross-direction" as used herein should be interpreted to refer to the direction of dispensing of labels formed from the cast or blown film.

At present, the most common dispensing method that is direction-and-stiffness-sensitive, i.e., is affected in significant measure by the degree of stiffness in the direction of movement of labels being dispensed, is dispensing past a peel-back edge. However the use of other direction-and-stiffness-sensitive dispensing methods and means are contemplated by the invention, including those somewhat less direction-and-stiffness-sensitive than a peel-back edge, such as for example systems shown in U.S. Pat. Nos. 4,217,164 and 4,303,461 wherein a split backing is pulled apart as it is advanced to initiate label dispensing with or without prior removal of the surrounding matrix of waste facestock material.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A method for conformably labelling workpieces that present substrates to which die-cut heat-set polymeric-film labels having a thickness of less than about 3 mils are applied by a labelling machine comprising the steps of extruding in film form a charge of polymeric material for label stock, directionally-stiffening and heat-setting said extruded film including selecting a differentiation between stiffness in the machine direction and stiffness in the cross-direction such that the degree of stiffening in the machine direction exceeds the degree of stiffening in the cross-direction and the degree of stiffening in the machine direction stiffens the heat set-film to a stiffness of between about 10 and about 60 Gurley in the machine direction, combining said differentially-stiffened heat-set film with an adhesive layer and a carrier, said carrier including a release surface means having release values in the range of from about 10 to about 80 grams/2 inch width measured at a peel rate of 400 inches/minute, die-cutting said film into a series of individual heat-set polymeric-film labels carried on said carrier, and dispensing said heat-set polymeric-film labels past a peel-back edge and onto workpieces that present substrates on which the labels are applied.

2. A method as set forth in claim 1, wherein said carrier is either a paper material, a polycoated paper material or a polymeric material.

3. A method as set forth in claim 2, wherein said release surface means comprises a silicone coating.

4. A method as set forth in claim 3, wherein said silicone coating has a weight of from about 0.5 to about 1 gram/meter$^2$.

5. A method as set forth in claim 1, wherein said carrier is a polycoated paper material having at least one polymeric treated surface, and said release surface means is formed by coating said polymeric treated surface with 100% solids polydimethylsiloxane at a coating weight of about 1 gram/meter$^2$ and UV curing said polydimethylsiloxane coating.

6. A method as set forth in claim 1, wherein said labels are applied at a higher line speed while maintaining conformability than is achievable for the same film on the same substrates using the same labelling machine, but without such machine and cross-direction stiffness differential.

7. A method as set forth in claim 1, wherein said step of dispensing said labels past a peel-back edge and onto workpieces is performed at a rate greater than about 200 workpieces per minute.

8. A method as set forth in claim 7, wherein said machine direction stiffness is in the range of from about 10 to about 20 Gurley.

9. A method as set forth in claim 1, wherein said release surface means has an average release value of about 45 grams/2 inch width at a peel rate of 400 inches/minute.

10. A method as set forth in claim 1, wherein said directionally-stiffening and heat-setting of said extruded film includes hot-stretching and heat-setting said extruded film, the degree of hot-stretching in the cross-direction being zero or greater, said step of hot-stretching including selecting a differentiation between hot-stretching in the machine direction and hot-stretching in the cross-direction such that the degree of hot-stretching in the machine direction exceeds the degree of hot-stretching in the cross-direction.

11. A method as set forth in claim 10, wherein said substrate is one of a deformable substrate or a rigid substrate.

12. A method for conformably labelling workpieces that present substrates to which die-cut heat-set polymeric-film labels having a thickness of less than about 3 mils are applied at high speeds by a labelling machine comprising the steps of providing a film of polymeric material for label stock, said film being differentially hot-stretched and heat set such that the degree of hot-stretching in the machine direction substantially exceeds the degree of hot-stretching in the cross-direction, combining said hot-stretched and heat-set film with an adhesive layer and a carrier, said carrier including a polymeric release surface means having an average release value of about 45 grams/2 inch width as measured at a peel rate of 400 inches per minute, die-cutting said film into a series of individual heat-set polymeric-film labels carried on said carrier, and dispensing said heat-set polymeric-film labels past a peel-back edge and onto workpieces that present substrates on which the labels are applied.

13. A method as set forth in claim 12, wherein said carrier is either a paper material, a polycoated paper material or a polymeric material.

14. A method as set forth in claim 12, wherein said release surface means is a silicone coating having a weight of about 0.5 to about 1 gram/meter$^2$.

15. A method as set forth in claim 14, wherein said release surface means has release values in the range of from about 10 to about 80 grams/2 inch width as measured at a peel rate of 400 inches per minute.

16. A method as set forth in claim 12, wherein said step of dispensing said labels past a peel-back edge and onto workpieces is performed at a rate greater than about 200 workpieces per minute.

17. A method for conformably labelling workpieces that present substrates to which die-cut heat-set polymeric-film labels having a thickness of less than about 3 mils are applied by a labelling machine comprising the steps of extruding in film form a charge of polymeric material for label stock, directionally-stiffening and heat-setting said extruded film including selecting a differentiation between stiffness in the machine direction and stiffness in the cross-direction such that the degree of stiffening in the machine direction exceeds the degree of stiffening in the cross-direction and the degree of stiffening in the machine direction stiffens the heat set-film to a stiffness of between about 10 and about 20 Gurley in the machine direction, combining said differentially-stiffened heat-set film with an adhesive layer and a carrier, said carrier including a release surface means, die-cutting said film into a series of individual heat-set polymeric-film labels carried on said carrier, and dispensing said heat-set polymeric-film labels past a peel-back edge and onto workpieces that present substrates on which the labels are applied at a rate greater than about 200 workpieces per minute.

18. A method as set forth in claim 17, wherein said release surface means comprises a silicone coating.

19. A method as set forth in claim 18, wherein said silicone coating has a weight of from about 0.5 to about 1 gram/meter$^2$.

* * * * *